June 25, 1929.　　　R. L. GILLESPIE　　　1,718,645
METHOD FOR MANUFACTURING INNER TUBES AND MANDREL TO BE USED THEREFOR
Filed April 7, 1925　　　2 Sheets-Sheet 1
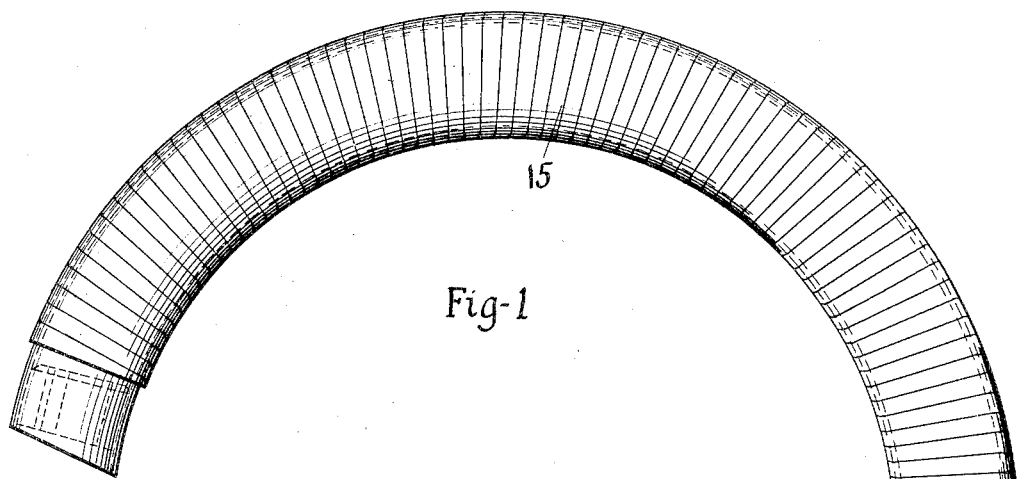
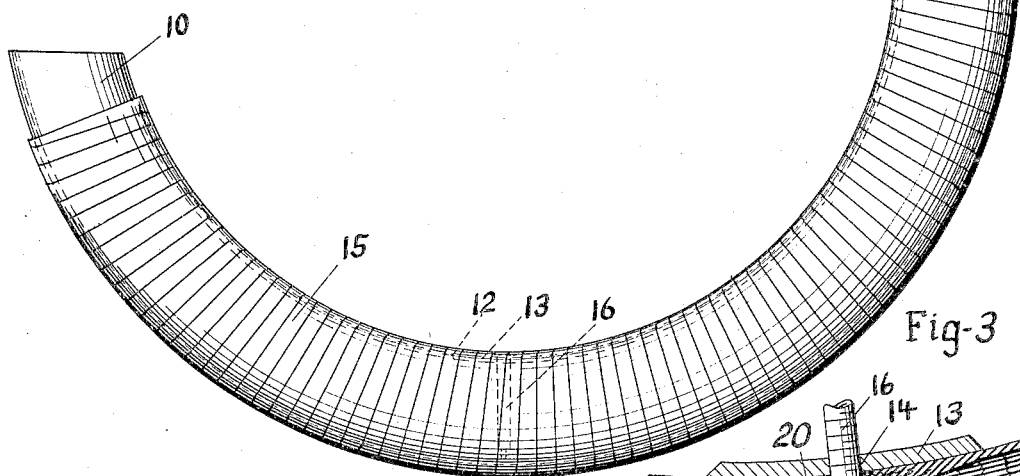
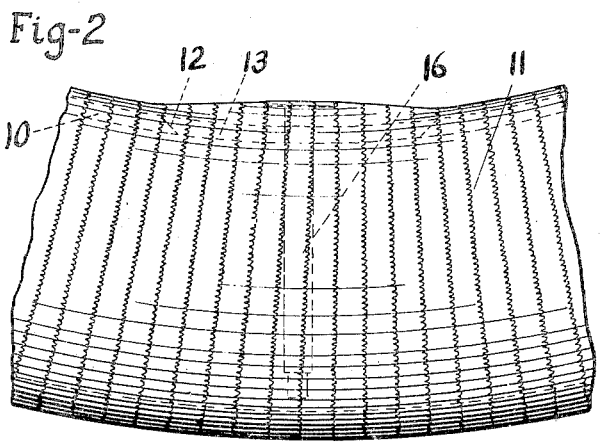
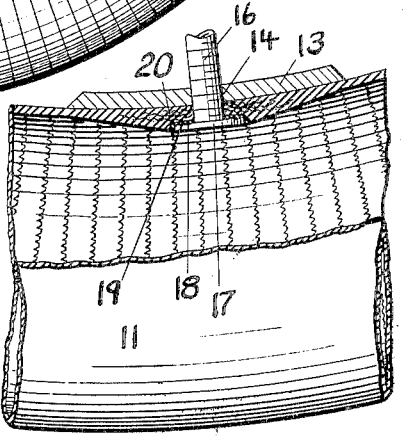
INVENTOR
Richard L. Gillespie
BY
ATTORNEY.

June 25, 1929.  R. L. GILLESPIE  1,718,645

METHOD FOR MANUFACTURING INNER TUBES AND MANDREL TO BE USED THEREFOR

Filed April 7, 1925  2 Sheets-Sheet 2

INVENTOR.
Richard L. Gillespie
BY
ATTORNEY.

Patented June 25, 1929.

1,718,645

UNITED STATES PATENT OFFICE.

RICHARD L. GILLESPIE, OF BARBERTON, OHIO, ASSIGNOR TO THE FIRESTONE TIRE AND RUBBER COMPANY, OF AKRON, OHIO, A CORPORATION OF OHIO.

METHOD FOR MANUFACTURING INNER TUBES AND MANDREL TO BE USED THEREFOR.

Application filed April 7, 1925. Serial No. 21,317.

This invention relates to inner tubes, to methods of making the same or other flexible rubber air pressure tubes or bags and particularly to methods of securing valves in said tubes and mandrels for use in the practice of the method.

Heretofore, in the art of making inner tubes, the tube is formed either on a straight or circular mandrel by applying the rubber or green tube thereto, helically wrapping a strip of fabric about the tube on the mandrel, curing the tube under pressure of said wrappings in a steam vulcanizer, removing the wrappings from the mandrel, stripping the tube from the mandrel, at the same time reversing the tube to bring its smooth surface on the exterior thereof, punching a valve hole in the tube and finally mechanically clamping the valve onto the tube with its stem extending through the hole, the tube being, of course, spliced to form a complete annulus. Usually also the tube where the valve hole is to be, has fabric reinforcements embedded therein through which the hole is punched.

The method, as described above, by which the valves are secured in the tubes, is open to a serious objection, in that the mechanical clamping of the valve on the tube does not produce a perfect seal and leakage of the tube occurs.

The chief object of the invention is to provide an inner tube in which the valve is secured by vulcanization whereby it is practically integral with the tube and leakage of the tube about the valve is avoided.

Another object is to provide a method for quickly and cheaply producing the above described inner tubes.

Another object is to provide an improved mandrel for use in practising the above method.

The foregoing and other objects are obtained by the tube construction, the method and the mandrel illustrated in the accompanying drawings, and described more fully below. The invention is not limited to the specific construction or method illustrated and described.

Of the accompanying drawings;

Figure 1 is a side elevation of a circular mandrel having a tube thereon, constructed according to the invention, and showing the fabric wrappings about the tube ready for the vulcanizing operation.

Figure 2 is an enlarged side elevation of a section of the mandrel showing the tube thereon after vulcanization and after the fabric wrappings have been removed, the valve being shown vulcanized to the tube;

Figure 3 is a side elevation of a section of the completed tube at the valve, the view being partly broken away and in section and showing the removable mandrel plate as it remains on the valve stem when the tube is stripped from the mandrel;

Figure 4:
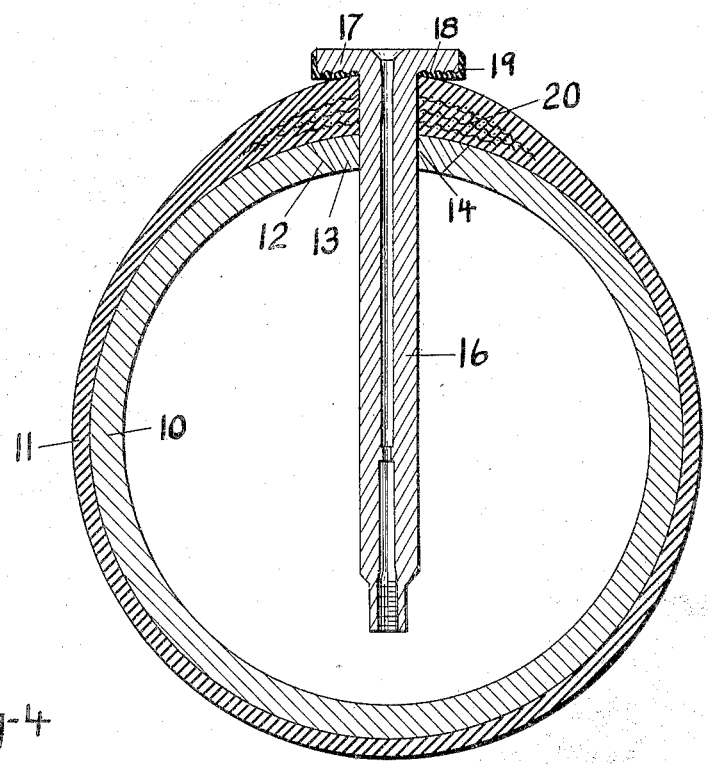
Figure 4 is a section through the mandrel, tube and valve illustrating the positions thereof before the fabric wrappings are applied.

In the drawings, 10 illustrates a hollow circular mandrel. It will be understood, however, that the invention may be carried out as well with the use of a straight mandrel. The mandrel 10 has the tube 11 thereon which may be applied thereto in any suitable manner. The mandrel 10, at the point where the valve is to be vulcanized onto the tube, is formed with an elongated slot 12 in which is removably seated a plate 13 formed with a valve stem aperture 14, the edges of plate 13 being beveled downwardly at about an angle of 45° and the edges of slot 12 being correspondingly beveled so that plate 13 will seat thereon as clearly shown in Figures 4 and 5.

On the tube 11 in Figure 1, is shown a helical wrapping of fabric 15 by which the tube is held under pressure on the mandrel during the curing operation. The valve is indicated at 16 and is formed with a base 17 roughened as shown at 18 and having a coating of rubber compound 19 thereon of such nature as will vulcanize onto the metal base 17, this compound being of a well-known character, similar compounds having been employed heretofore on the metal rims on which solid tires are vulcanized. The tube 11 may be supplied with the usual fabric valve patch 20.

Figure 5:
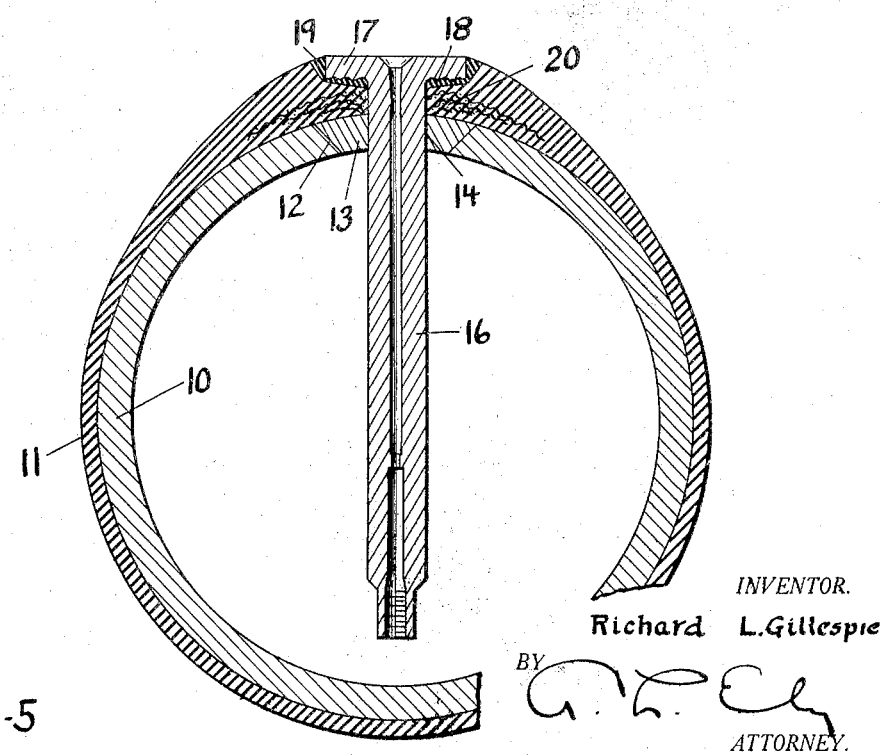
Figure 5 is a similar section showing the tube and valve vulcanized together on the mandrel, the wrappings having been removed just prior to the stripping operation.

In the practise of the method, according to the preferred procedure, valve stems of suitable material, such as unplated brass, and without the valve inside, are used. The base of this valve is washed in caustic, etched and dipped in a rubber cement and the compound 19 in the form of a paste or uncured rubber washer is then applied to the base substantially as shown in Figure 4.

The removable mandrel plate 13 is given a light coat of rubber cement and seated in slot 12, the cement serving to hold the plate in place therein. The green tube 11 is then formed or applied on the mandrel according to the customary procedures, the valve hole is punched through the tube at valve aperture 14, and patch 20, which has previously had the valve hole punched therethrough, is applied to the tube. The valve stem 16 is then inserted through the patch, tube and aperture 14, so that the barrel thereof projects into the mandrel (Figure 4) and wrapping 15 is applied in the usual manner, the base 17 being embedded in the tube 11 by the pressure thereof. The tube is then vulcanized.

After vulcanization, the wrappings 15 are removed and the tube stripped from the mandrel by the common method, the tube being reversed by this operation and the plate 13 coming off the mandrel with the tube as illustrated in Figure 3, binding of the valve or stripping of the threads being thus avoided. Plate 13 is then withdrawn from the valve stem and the tube spliced as will be understood.

It will be seen from the foregoing that by the practise of the method, a more perfect container for air is provided and the tube is entirely a steam welded unit in which the valve is integral with the tube. The positive sealing of inner tubes is of particular benefit because a large proportion of air loss at high pressure is at the clamped-on valve base. Moreover, the method affords the possibility of dispensing with a number of valve fittings including hexagon nut and ring washers since tubes manufactured according to the above method will be perfectly sealed at the base without the use of these fittings.

Applicant believes himself to be the first to disclose an inner tube construction in which the valve is vulcanized integral with the tube and also the first to disclose a practical operative process whereby this may be accomplished. He therefore believes himself entitled to broad and liberal protection. Modifications of the invention accordingly may be resorted to without departing from the spirit thereof or the scope of the appended claims.

What I claim is:

1. The method of making inner tubes with integral valves, comprising, providing a valve having a roughened unplated brass base, washing the valve base in a caustic solution, etching said base, coating said base with a rubber cement solution, applying an uncured rubber compound to said base about the barrel of the valve, said compound being adapted to form a union between the metal of the valve and the soft rubber of the tube, providing a hollow mandrel with an elongated slot, providing a removable plate with a valve aperture therethrough for seating in said slot, coating said plate with a rubber cement, seating it in said slot, applying an uncured rubber tube on said mandrel, punching a hole through the tube over the plate aperture, applying a valve patch on said tube with an aperture therein aligned with the valve aperture in said tube and plate, inserting the barrel of said valve through said patch, tube and plate so that the barrel will project into the mandrel and the base will contact the tube, wrapping a fabric strip helically about the mandrel under tension to press the tube onto the mandrel and to embed the valve base in the tube, vulcanizing the tube, removing the wrappings, reversely stripping the tube whereby the barrel of the valve will be withdrawn from the mandrel carrying the mandrel plate thereon, removing the mandrel plate from the barrel of the valve and completing the tube by a splicing operation.

2. The method of making inner tubes with integral valves, comprising, washing the valve base in a caustic solution, etching said base, coating said base with a rubber cement solution, applying an uncured rubber compound to said base about the barrel of the valve, said compound being adapted to form a union between the metal of the valve and the soft rubber of the tube, providing a hollow mandrel with an elongated slot, providing a removable plate with a valve aperture therethrough for seating in said slot, applying an uncured rubber tube on said mandrel, punching a hole through the tube over the plate aperture, applying a valve patch on said tube with an aperture therein aligned with the valve aperture in said tube and plate, inserting the barrel of said valve through said patch, tube and plate so that the barrel will project into the mandrel, wrapping a fabric strip helically about the mandrel under tension to press the tube onto the mandrel and to embed the valve base in the tube, vulcanizing the tube, removing the wrapping, reversely stripping the tube whereby the barrel of the valve will be withdrawn from the mandrel carrying the mandrel plate thereon, removing the mandrel plate from the barrel of the valve and completing the tube.

3. The method of making inner tubes with integral valves, comprising, applying an uncured rubber compound to the valve base about the barrel of the valve, said compound being adapted to form a union between the metal of the valve and the soft rubber of the tube, providing a hollow mandrel with an elongated slot, providing a removable plate with a valve aperture therethrough for seating in said slot, applying an uncured rubber tube on said mandrel, punching a hole through the tube over the plate aperture, inserting the barrel of said valve through tube and plate so that the barrel will project into the mandrel, vulcanizing the tube while exerting pressure on the base of the valve to embed it in said tube, reversely stripping the tube whereby the barrel of the valve will be withdrawn from the mandrel carrying the mandrel plate thereon, removing the mandrel plate from the barrel of the valve and completing the tube.

4. A hollow mandrel for the uses and purposes set forth, said mandrel having an elongated slot in the wall thereof, and a removable apertured plate adapted to seat on the mandrel to cover the slot, said plate and slot having mating beveled seating edges.

5. A hollow mandrel for the uses and purposes set forth, said mandrel having a valve receiving elongated slot therein, and a cover plate for said slot having a valve aperture therethrough.

RICHARD L. GILLESPIE.